(12) United States Patent
Liao

(10) Patent No.: US 9,418,038 B2
(45) Date of Patent: Aug. 16, 2016

(54) METHOD AND SYSTEM FOR ACCESSING DATA

(71) Applicant: Wistron Corporation, New Taipei (TW)

(72) Inventor: Wen-Te Liao, New Taipei (TW)

(73) Assignee: Wistron Corporation, New Taipei (TW)

( * ) Notice: Subject to any disclaimer, the term of this patent is extended or adjusted under 35 U.S.C. 154(b) by 363 days.

(21) Appl. No.: 14/151,818

(22) Filed: Jan. 10, 2014

(65) Prior Publication Data

US 2015/0074307 A1 Mar. 12, 2015

(30) Foreign Application Priority Data

Sep. 10, 2013 (TW) .............................. 102132604 A

(51) Int. Cl.
*G06F 3/00* (2006.01)
*G06F 13/42* (2006.01)
*G06F 13/10* (2006.01)
*G06F 13/38* (2006.01)

(52) U.S. Cl.
CPC .......... *G06F 13/4291* (2013.01); *G06F 13/102* (2013.01); *G06F 13/382* (2013.01)

(58) Field of Classification Search
CPC ....................................................... G06F 15/173
See application file for complete search history.

(56) References Cited

U.S. PATENT DOCUMENTS

2012/0246304 A1* 9/2012 Mase .................. G06F 11/3055 709/224

FOREIGN PATENT DOCUMENTS

TW I255406 5/2006

* cited by examiner

*Primary Examiner* — Cheng-Yuan Tseng
(74) *Attorney, Agent, or Firm* — Jianq Chyun IP Office

(57) ABSTRACT

A method and a system for accessing data are provided. A management module is used for receiving multiple transmission data and multiple identification codes from application programs respectively and storing the transmission data to a queue according to a receiving order. One of the transmission data from the queue is obtained by the management module according to a delivering order, and the obtained transmission data is transferred to a corresponding device through an inter-integrated circuit (I²C) driving module. The management module is used for receiving response data from the device through the I²C driving module and then transferring the received response data to the corresponding application program.

10 Claims, 5 Drawing Sheets

METHOD AND SYSTEM FOR ACCESSING DATA

CROSS-REFERENCE TO RELATED APPLICATION

This application claims the priority benefit of Taiwan application serial no. 102132604, filed on Sep. 10, 2013. The entirety of the above-mentioned patent application is hereby incorporated by reference herein and made a part of this specification.

BACKGROUND

1. Field of the Invention

The invention is directed to a data transmission technique and more particularly, to a method and a system for accessing data through an inter-integrated circuit ($I^2C$) bus.

2. Description of Related Art

An inter integrated circuit ($I^2C$) bus is a kind of serial communication bus and is common used in a motherboard, an embedded system or a mobile phone for connecting to low-speed peripheral devices. Recently, the $I^2C$ bus is a common data transmission interface used in an electronic product and serves for transferring some low-speed data, which includes a temperature sensor, a speed sensor, a digital gyroscope or the like.

Nevertheless, the $I^2C$ bus has a limitation on the number thereof in hardware design, and in most cases, a plurality of $I^2C$ devices is connected on the same $I^2C$ bus, which often results in a situation that the $I^2C$ bus is simultaneously accessed by multiple devices. At this point, in case that control software can not be performed properly, it inevitably leads to incorrect data accessing. Therefore, the system is affected to be unstable, such that the difficulty in the debugging of a driver of a single device occurs during the development process, which results in prolonged development time.

SUMMARY

The invention provides a method and a system for accessing data, in which a plurality of inter-integrated circuit ($I^2C$) devices can share an $I^2C$ bus in common, without causing an error of simultaneous accessing.

The invention is directed to a method for accessing data applicable to an electronic apparatus. The method includes the following steps. A management module receives a plurality of transmission data and a plurality of identification codes respectively from a plurality of application programs and stores the plurality of transmission data to a queue according to a receiving order. The management module obtains one of the plurality of transmission data according to a delivering order of the queue. The management module transfers the obtained transmission data to a corresponding device through an inter-integrated circuit ($I^2C$) driving module. The management module receives one corresponding response data from the device through the $I^2C$ driving module. The management module transfers the response data to one of the corresponding application programs according to one of the plurality of identification codes corresponding to the obtained transmission data.

In an embodiment of the invention, before the step of the management module receiving the plurality of transmission data and the plurality of identification codes respectively from the plurality of application programs, method further includes the following steps. The management module receives a register request from each of the application programs to generate one of the plurality of identification codes according to the register request and transfers the one of the plurality of identification codes corresponding to the register request to each of the application programs.

In an embodiment of the invention, in the method, the management module further receives a unregister request from each of the application programs to cancel one of the plurality of identification codes corresponding to the unregister request.

In an embodiment of the invention, a transmission format of each of the application programs includes one of the plurality of identification codes, an $I^2C$ address, a data length and a content of the transmission data.

In an embodiment of the invention, in the method, the management module further checks whether one of the plurality of transmission data exists in the queue and obtains one of the plurality of transmission data according to the delivering order when checking that the one of the plurality of transmission data exists in the queue.

The invention is directed to a system for accessing data including a device, an $I^2C$ bus coupled to the device, a processing unit coupled to the $I^2C$ bus and accessing the device through the $I^2C$ bus and a storage unit coupled to the processing unit and storing a plurality of modules to be executed by the processing unit. The modules includes a management module receiving a plurality of transmission data and a plurality of identification codes from a plurality of application programs, storing the plurality of transmission data to a queue according to a receiving order and transferring the plurality of transmission data according to a delivering order and an $I^2C$ driving module communicating with the plurality of application programs via the management module and accessing the device through the $I^2C$ bus. The management module the management module obtains one transmission data from the plurality of transmission data and transfers the obtained transmission data to the $I^2C$ driving module according to the delivering order, and the $I^2C$ driving module transfers the obtained transmission data to the device through the $I^2C$ bus and transfers one response data received from the device through the $I^2C$ bus to the management module, such that the management module transfers the response data to one of the corresponding application programs according to one of plurality of identification codes corresponding to the obtained transmission data.

Based on the above, the invention utilizes the management module to manage the accessing operation to the $I^2C$ bus, such that the $I^2C$ bus can be prevented from being accessed simultaneously in the scenario where a plurality of $I^2C$ devices shares the same $I^2C$ bus in common.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In a computer system, an inter-integrated circuit ($I^2C$) bus is commonly provided to be connected with peripheral devices and driven using software or firmware to achieve the purpose of control the peripheral devices. An error of simultaneous accessing occurs easily due to a plurality of $I^2C$ devices sharing the same $I^2C$ bus in common. Thus, in order to resolve the aforementioned issue, the invention provides a method and a system for accessing data, in which the $I^2C$ bus is accessed in an asynchronous way so as to prevent the $I^2C$ bus being simultaneously accessed.

Figure 1:
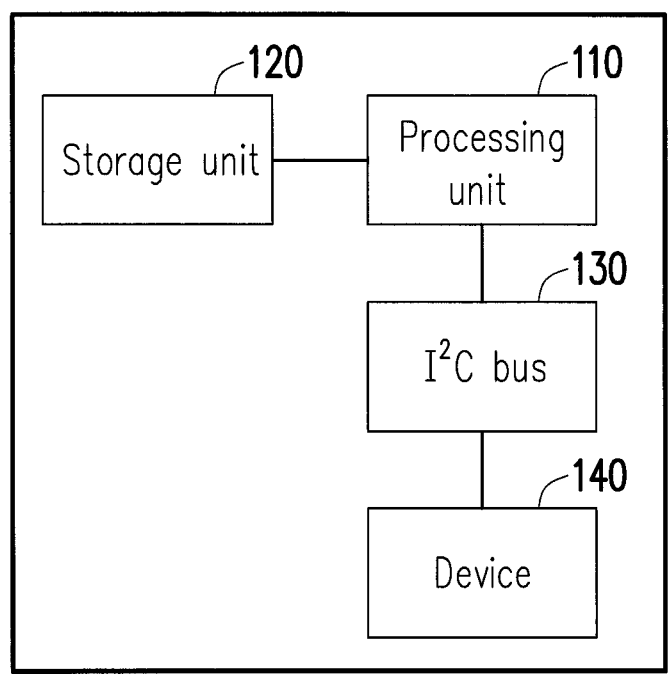
FIG. 1 is a block diagram of a system for accessing data according to an embodiment of the invention.

FIG. 1 is a structural diagram of the system for accessing data according to an embodiment of the invention. With reference to FIG. 1, the system of the present embodiment is an electronic apparatus, such as a mobile phone, a notebook computer (NB), a desktop computer or the like, which includes a processing unit 110, a storage unit 120, an $I^2C$ bus 130 and a device 140. The processing unit 110 is coupled to the storage unit 120 and the $I^2C$ bus 130, and accesses the device 140 via the $I^2C$ bus 130.

The processing unit 110 is, for example, a central processing unit (CPU) or any other programmable microprocessor. The storage unit 120 is, for example, a random access memory (RAM), a read-only memory (ROM), a flash memory, a magnetic disk storage device or the like. The device 140 is, for example, a temperature sensor, a speed sensor, a digital gyroscope or the like with an $I^2C$ interface.

In the present embodiment, the storage unit 120 stores a plurality of code segments. The code segments after being installed are executed by the processing unit 110. The code segments include a plurality of instructions, and the processing unit 110 uses the instructions to perform a plurality of steps of a method for accessing data. In the present embodiment, the system for accessing data includes only one processing unit 110, but in other embodiments, the system for accessing data may include a plurality of processing units 110 for executing the installed code segments.

Figure 2:
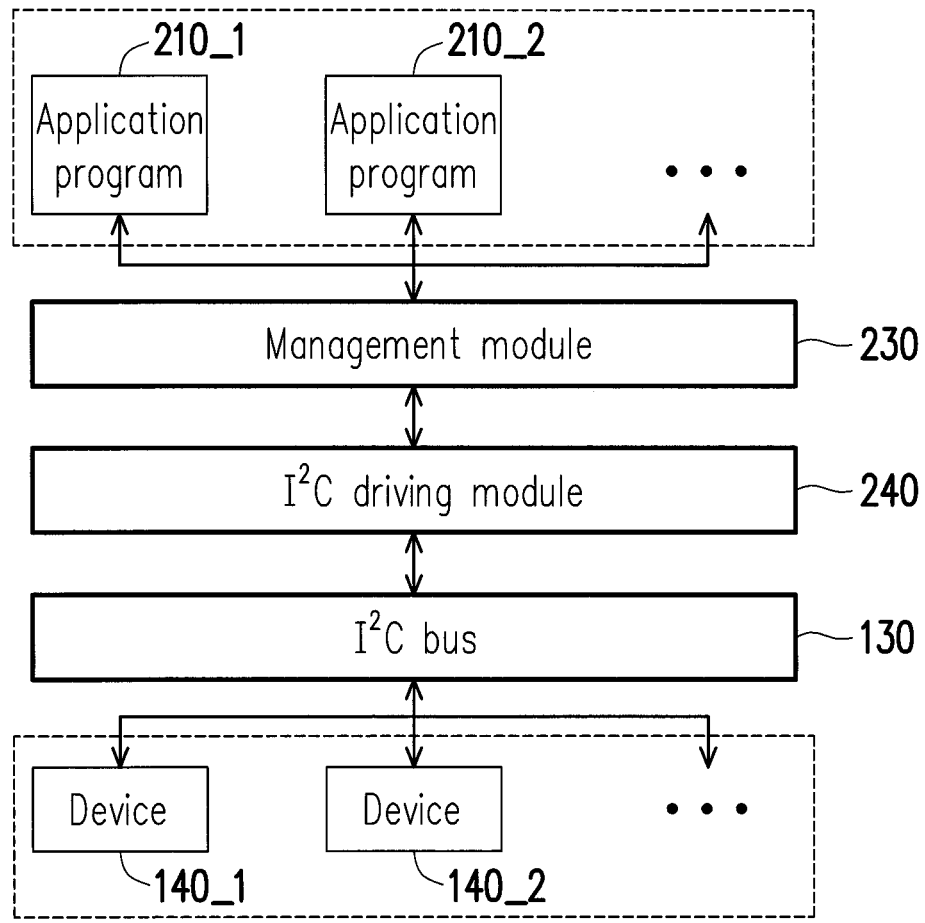
FIG. 2 is a structural diagram of the system for accessing data according to an embodiment of the invention.

FIG. 2 is a structural diagram of the system for accessing data according to an embodiment of the invention. With reference to both FIG. 1 and FIG. 2, a management module 230 and $I^2C$ driving module 240 exist in, for example, the storage unit 120 to be executed by the processing unit 110. For descriptive convenience, two application programs 210_1 and 210_2 and two device 140_1 and 140_2 with the $I^2C$ interfaces are illustrated. Nevertheless, in other embodiments, the numbers of the application programs and the devices are not limited.

In the present embodiment, a management module 230 is installed in an operation system (OS) which is especially responsible for controlling software or firmware of the $I^2C$ bus 130, and all accessing operations to the $I^2C$ bus 130 have to be performed through the control of the management module 230, such that the $I^2C$ bus 130 can be prevented from being simultaneously accessed by a plurality of application programs. Additionally, the management module 230 is also configured with a memory space for placing $I^2C$ instructions and data waiting for being processed. The memory space is, for example, a first in first out (FIFO) queue. In the queue, the instructions and data of the $I^2C$ bus 130 to be accessed by the application programs 210_1 and 210_2 to may be temporarily stored. The management module 230 processes the received transmission data according to a delivering order of the queue and returns response data which is obtained after processing transmission data to an application program which request for accessing the device. The management module 230 may be general type application software or a driver.

The $I^2C$ driving module 240, i.e., a driver of the $I^2C$ bus 130, communicates with the application programs 210_1 and 210_2 via the management module 230 and accesses the devices 140_1 and 140_2 through the $I^2C$ bus 130.

Figure 3:
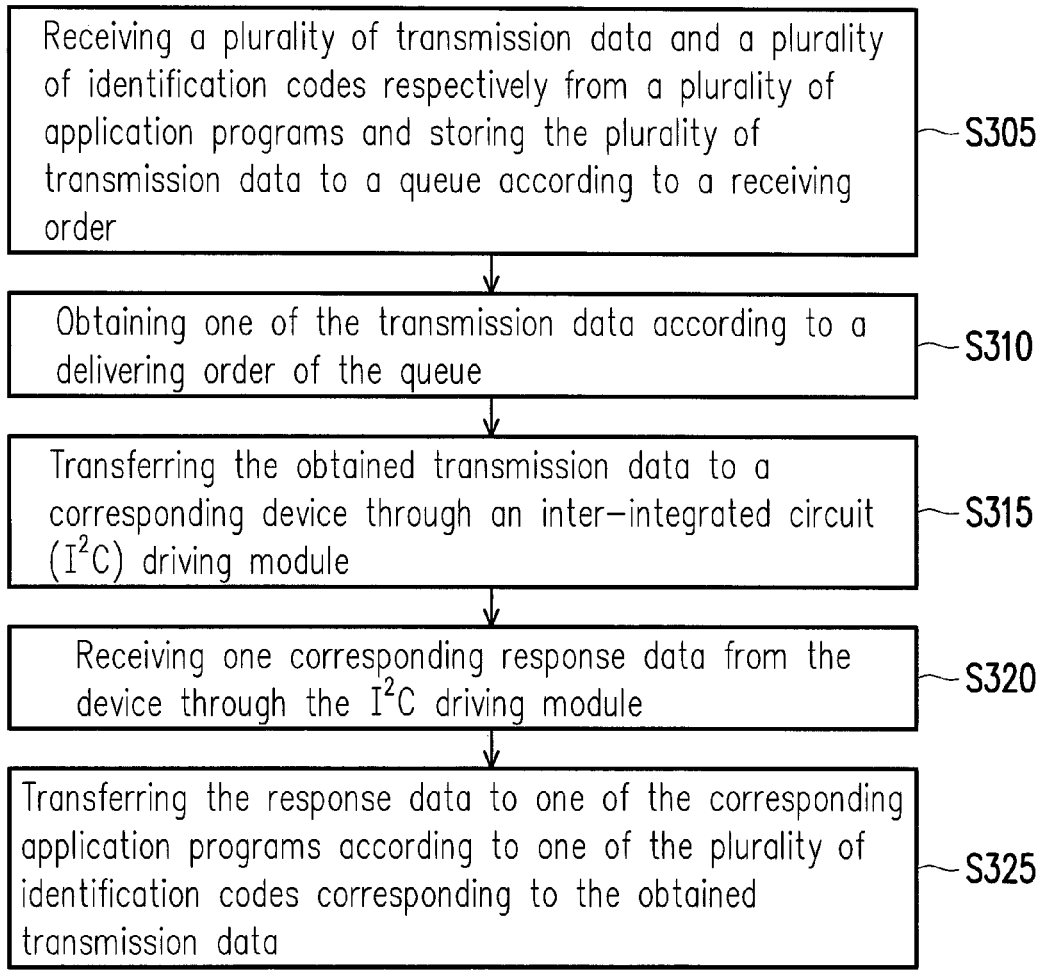
FIG. 3 is a flowchart of a method for accessing data according to an embodiment of the invention.

Hereinafter, a process for accessing data will be described in detail accompanying with the operation of the aforementioned system. FIG. 3 is a flowchart of a method for accessing data according to an embodiment of the invention. In the present embodiment, taking the application programs 210_1 and 210_2 for example and based on an assumption that the application programs 210_1 and 210_2 are about to simultaneously access the devices 140_1 and 140_2 through the $I^2C$ bus 130. Namely, the application program 210_1 is about to access the device 140_1 through the $I^2C$ bus 130, while the application program 210_2 is about to access the device 140_2 through the $I^2C$ bus 130.

Figure 4:
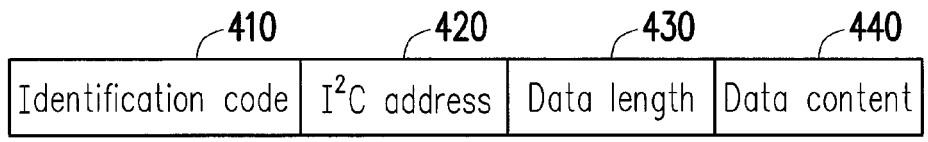
FIG. 4 is a schematic diagram of a transmission format according to an embodiment of the invention.

With reference to both FIG. 2 and FIG. 3, in step S305, the management module 230 receives a plurality of transmission data and a plurality of identification codes respectively from a plurality of application programs and stores the transmission data to a queue according to a receiving order. In this case, an application program, for example, packages each of the transmission data and each of the identification codes as a packet complying with a transmission format and then, transfers the packet to the management module 230. For instance, FIG. 4 is a schematic diagram of a transmission format according to an embodiment of the invention. With reference to FIG. 4, the transmission format includes four fields 410 through 440. The field 410 records an identification code, the field 420 records an $I^2C$ address to be accessed by a device, the field 430 records a data length, and the field 440 records data content (including transmission data and/or an instruction). The identification code is used to identify an identity of an application program.

The application programs 210_1 and 210_2 first respectively package identification codes and transmission data corresponding thereto as packets complying with the transmission format illustrated in FIG. 4 and then transfers the packets to the management module 230. After receiving the packets, the management module 230 stores the packets to the queue according to the order of receiving the packets so as to process the packets one by one sequentially.

Afterward, the management module 230 checks whether any transmission data exists in the queue so as to obtain one of the transmission data according to a delivering order when checking that the transmission data exists in the queue. That is, in step S310, the management module 230 obtains transmission data with a first delivering order from the queue according to the delivering order of the queue. The aforementioned queue is, for example, a FIFO queue, and transmission data that first enters the queue will be processed first, and another transmission data entering the queue afterward has to wait. For descriptive convenience, description with respect to an example where the transmission data of the application program 210_1 is the first data written into the queue will be set forth below. Namely, in this case, the management module 230 obtains the packet with the first delivering order which is transferred by the application program 210_1 from the queue and disassembles the packet to obtain the content, the I²C address to be transferred to and the data length of the transmission data.

Then, in step S315, the management module 230 transfers the obtained transmission data to the corresponding device 140_1 using the I²C driving module 240 through the I²C bus 130. For instance, the management module 230 re-packages the content, the I²C address to be transferred to and the data length of the transmission data and transfers the re-packaged packet to the corresponding device 140_1 according to the recorded I²C address.

Thereafter, in step S320, the management module 230 receives corresponding response data from the device 140_1 using the I²C driving module 240. Meanwhile, in step S325, the management module 230 transfers the response data to the corresponding application program 210_1 according to the corresponding identification code. For example, the management module 230 re-packages the response data and the identification code a the packet in compliance with the transmission format illustrated in FIG. 4 and then returns the re-packaged packet to the application program 210_1.

An embodiment of a timing sequence of devices accessed by a single application program via the management module 230 and an embodiment of a timing sequence of devices accessed by multiple application programs via the management module 230 will be illustrated an examples below.

Figure 5:
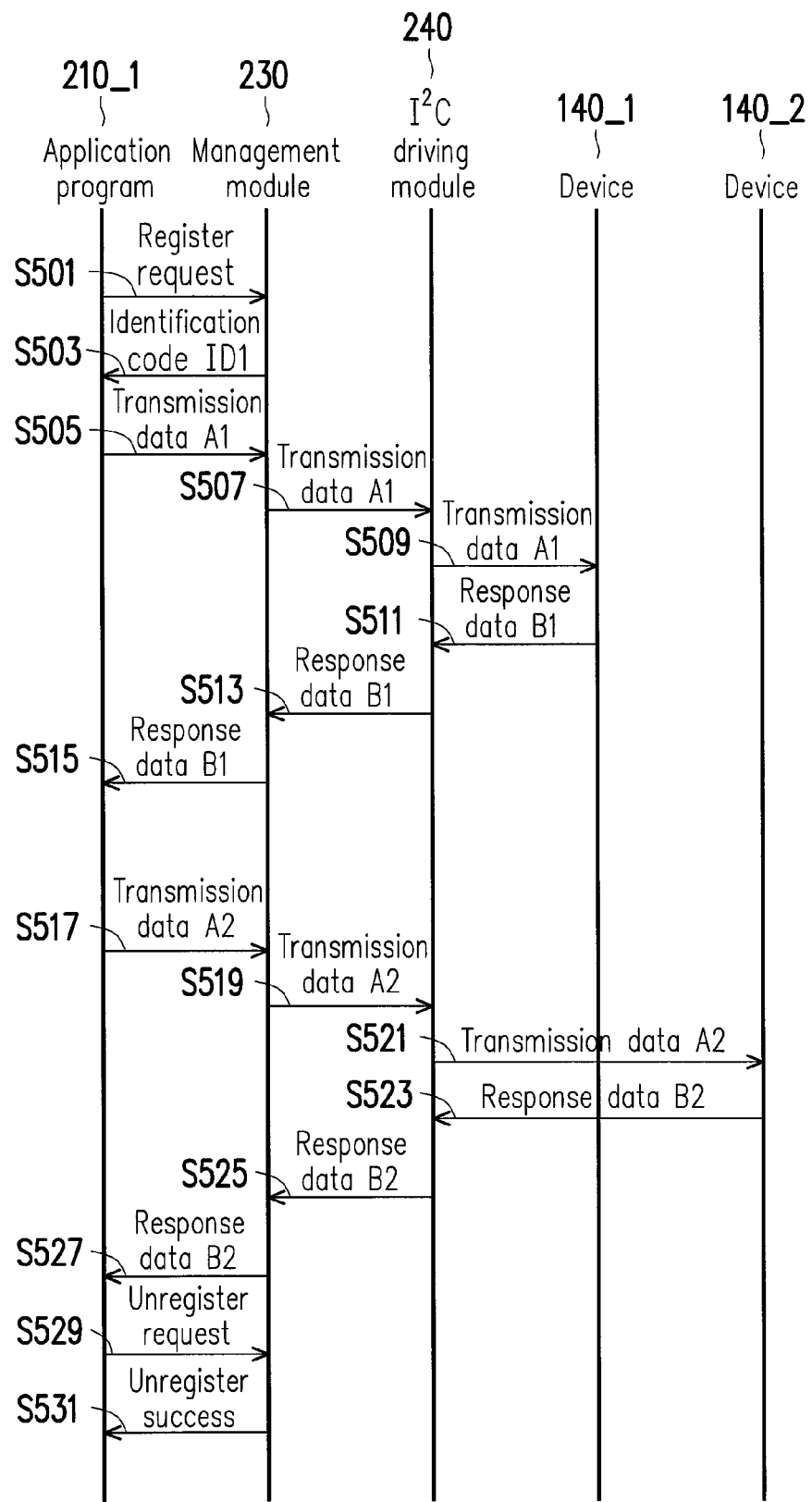
FIG. 5 is a flowchart of a method for a single application program accessing data according to an embodiment of the invention.

FIG. 5 is a flowchart of a method for a single application program accessing data according to an embodiment of the invention. In FIG. 5, a process of the application program 210_1 assessing the devices 140_1 and 140_2 via the management module 230 is illustrated as an example.

First, in step S501, the application program 210_1 sends a register request to the management module 230. When receiving the register request, the management module 230 generates (or looks up for) an identification code ID1 according to the register request. Then, in step S503, the management module 230 returns the identification code ID 1 to the application program 210_1.

In step S505, the application program 210 transfers transmission data A1 to the management module 230. For instance, the application program 210_1 packages the identification code ID1, an I²C address to be accessed by the device 140_1, a data length and the content of the transmission data A1 in a packet and then transfers the packet to the management module 230. After receiving the packet, the management module 230 stores the packet to the queue.

Thereafter, in step S507, the management module 230 obtains the first packet from the queue, disassembles the packet to receive the transmission data A1, and transforms the transmission data A1 into a packet in compliance with the I²C format so as to transfer the transmission data A1 to the I²C driving module 240 according to the I²C address. Besides, in step S509, the transmission data A1 is transferred to the device 140_1 through the I²C bus 130.

Afterward, in step S511, the device 140_1 transfers response data B1 to the I²C driving module 240 through the I²C bus 130. Further, in step S513, the I²C driving module 240 transfers the response data B1 to the management module 230. In step S515, the management module 230 packages the response data B1 of the device 140_1 in a packet complying with the transmission format (as illustrated in FIG. 4) and then returns the packet to the application program 210_1.

Then, in step S517, the application program 210_1 transfers another transmission data A2 to the device 140_2. The application program 210_1 packages the transmission data A2 and the identification code ID 1 in a packet complying with the transmission format (including the identification code ID1 corresponding to the application program 210_1, an I²C address to be accessed by the device 140_2, a data length and the content of the transmission data A2) and then transfers the packet to the management module 230. After receiving the packet from the application program 210_1, the management module 230 places the packet to the queue.

After that, in step S519 (in the same way of step S507), the management module 230 obtains the packet from the queue, disassembles the packet to receive the transmission data A2 and transfers the packet in the I²C format to the I²C driving module 240. Further, in step S521, the I²C driving module 240 transfers the transmission data A2 to the device 140_2 through the I²C bus 130.

Then, in step S523, the device 140_2 transfers response data B2 to I²C driving module 240 through the I²C bus 130. In step S525, the I²C driving module 240 returns the response data B2 of the device 140_2 to the management module 230. Further, in step S527, the management module 230 returns the response data B2 in the transmission format to the application program 210_1.

When no longer performing data transmission with the devices 140_1 and 140_2, or being ended, the application program 210_1 may cancel the registration step via the management module 230, such that the management module 230 may release the resources to other application programs. In step S529, the application program 210_1 sends an unregister request to the management module 230 so as to cancel the register request. Further, in step S531, the management module 230 notifies the application program 210_1 about the success of the unregistration, for example, by sending a specific value "−1" to the application program 210_1 to indicate that the identification code ID 1 is successfully unregistered.

In steps S501 through S531 above, the data transmission between the application program 210_1 and the devices 140_1 and 140_2 having the I²C interfaces is started with the step of first sending the register request to the management module 230 (step S501) and then returning the corresponding identification code to the application program 210_1 from the management module 230. The application program 210_1 sends the register request to the management module 230 to obtain the corresponding identification code and then is allowed to communicate with the devices 140_1 and 140_2. The identification code is used in the transmission format (e.g., the field 410 illustrated in FIG. 4) when the application program 210_1 accesses the devices 140_1 and 140_2 via the management module 230.

Figure 6:
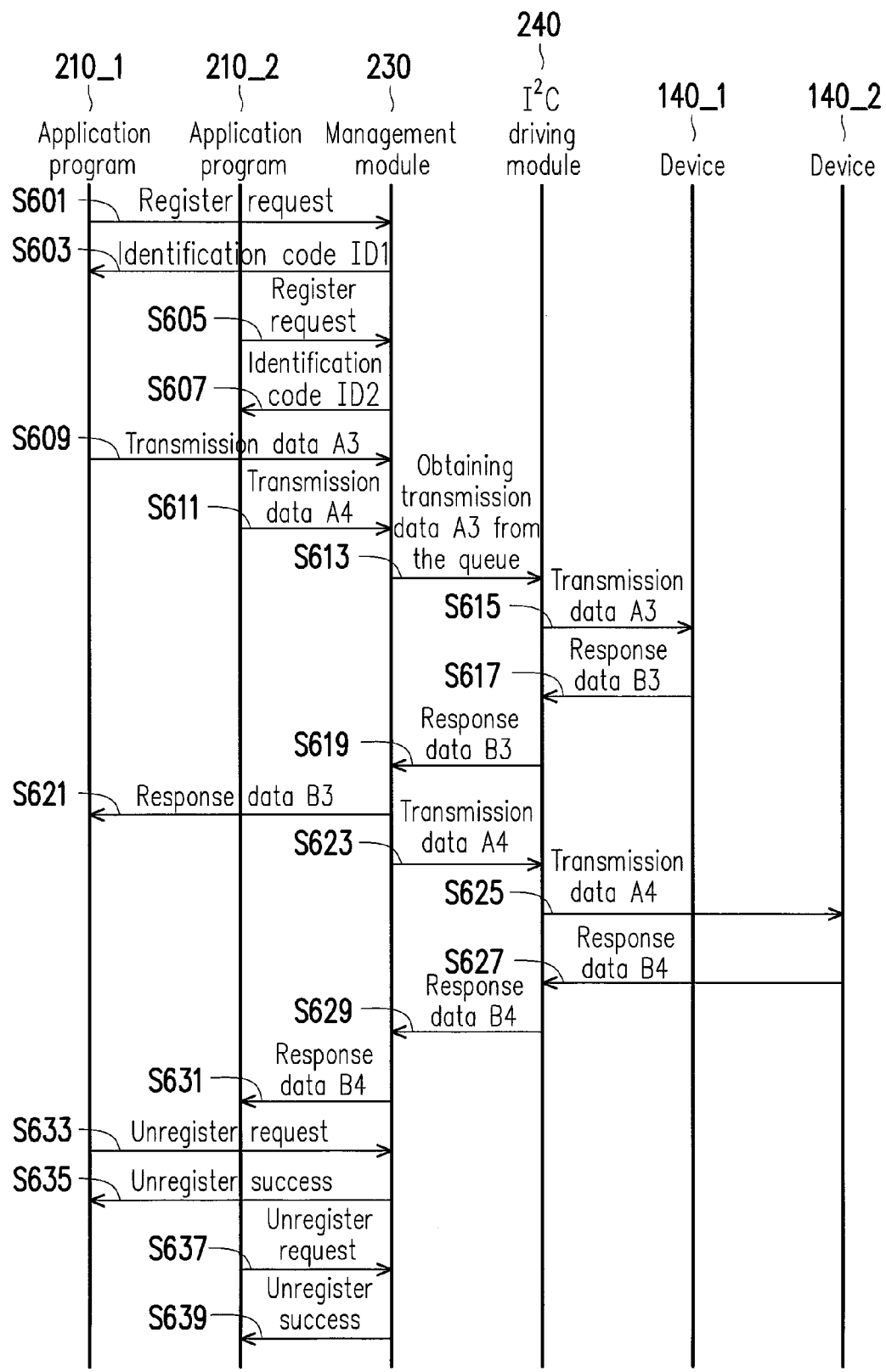
FIG. 6 is a flowchart of a method for two application programs accessing data according to an embodiment of the invention.

In addition, a process according to a timing sequence of devices accessed by multiple application programs via the management module 230 will be described in detail below. FIG. 6 is a flowchart of a method for two application programs accessing data according to an embodiment of the invention. In FIG. 6, a process of the application program 210_1 accessing the device 140_1 via the management module 230 while the application program 210_2 also accessing the device 140_2 via the management module 230 is illustrated as an example.

In step S601, the application program 210_1 sends a register request to the management module 230 for registration. Then, in step S603, the management module 230 returns an identification code ID1 to the application program 210_1.

Meanwhile, in step S605, the application program 210_2 simultaneously sends a register request to the management module 230 for registration. Then, in step S607, the management module 230 returns an identification code ID2 to the application programs 210_2.

Thereafter, in step S609, the application program 210_1 transfers transmission data A3 in a transmission format to the management module 230. For instance, the application program 210_1 packages the identification code ID1, an I²C address to be accessed by the device 140_1, a data length and the content transmission data A3 in a packet and then transfers the packet to the management module 230.

Then, in step S611, the application program 210_2 transfers transmission data A4 in a transmission format to the management module 230. For instance, the application program 210_2 packages the identification code ID2, an I²C address to be accessed by the device 140_2, a data length and the content of the transmission data A4 in a packet and transfers the packet to the management module 230.

In this case, the application program 210_1 and the application program 210_2 simultaneously transfer the transmission data A3 and the transmission data A4. At this time, the application program 210_1 does not yet receive response data returned by the management module 230, but the application program 210_2 already transfers the transmission data A4, and thus, if the data transmission is not well controlled using, a data error or other unexpected results will occur due to the I²C bus 130 being simultaneously accessed by both the transmission data A3 and the transmission data A4. In the present embodiment, the management module 230 is configured between the application programs 210_1 and 210_2 and the I²C bus 130 to manage the data transmission therebetween, such that the transmission data A3 and the transmission data A4 to be transferred are first placed in a queue (e.g., a FIFO queue) for the management module 230 to then process the two transmission data one by one according to a delivering order of the queue.

Afterward, the management module 230 obtains the first data from the queue, which is the data having the first delivering order. Here, it is assumed that the first data is the transmission data A3. For instance, after obtaining a first packet from the queue, disassembling the packet to receive the transmission data A3, the management module 230 transforms the packet into a packet complying with the I²C format (including the I²C address to be accessed by the device 140_1, the data length and the content of the transmission data A3) and then transfers the transmission data A3 to the I²C driving module 240 according to the I²C address, as shown in step S613. Further, in step S615, the I²C driving module 240 transfers the transmission data A3 to the device 140_1 through the I²C bus 130.

Then, in step S617, the device 140_1 transfers response data B3 to the I²C driving module 240 through the I²C bus 130, and in step S619, the I²C driving module 240 returns the response data B3 to the management module 230. Further, in step S621, the management module 230 returns the response data B3 of the device 140_1 in the transmission format (e.g., the transmission format illustrated in FIG. 4) to the application program 210_1. Until now, application program 210_1 receives the response data (i.e., the response data B3). Then, the management module 230 further obtains the next data (i.e., the transmission data A4) from the queue for processing.

The management module 230 obtains the next packet (i.e., the first packet at this moment due to the prior packet is already processed) from the queue and disassembles the packet to receive the transmission data A4. In step S623, the management module 230 transfers the transmission data A4 in the I²C format to the I²C driving module 240. In step S625, the I²C driving module 240 transfers the transmission data A4 to the device 140_2 through the I²C bus 130.

After that, in step S627, the device 140_2 returns response data B4 to the I²C driving module 240. In step S629, the I²C driving module 240 returns the response data B4 of the device 140_2 to the management module 230. Then, in step S631, the management module 230 returns the response data B4 in the transmission format to the application program 210_2. At this time, the application program 210_2 also receives the response data B4 returned from the device 140_2.

Moreover, when no longer performing data transmission with the devices 140_1 and 140_2, or being ended, the application programs 210_1 and 210_2 may cancel the registration step via the management module 230, such that the management module 230 may release the resources to other application programs.

Referring to step S633, the application program 210_1 sends an unregister request to the management module 230. In step S635, the management module 230 notifies the application program 210_1 about the success of the unregistration about the success of the unregistration, for example, by sending a specific value "−1" to the application program 210_1 to indicate that the identification code ID1 is successfully unregistered.

Likewise, in step S637, the application program 210_2 sends an unregister request to the management module 230. In step S639, the management module 230 notifies the application program 210_2 about the success of the unregistration, for example, by sending a specific value "−1" to the application program 210_2 to indicate that the identification code ID2 is successfully unregistered.

In the embodiment above, the application program 210_2 does not receive the response data B4 returned by the device 140_2 right away after the transmission data A4 is transferred, but waiting until the management module 230 processes the transmission data A4 transferred by the application program 210_2, the application program 210_2 can obtain the response data B4 returned by the device 140_2. Accordingly, with the management of the management module 230, the I²C bus 130 is controlled to process the transmission and receiving of only one data in one time, that is, process only one I²C instruction in one time, without causing data error or any other unexpected results due to the randomly alternating transmission and receiving operations of the data.

To sum up, in the embodiments described above, a management module is configured between the application programs and the I²C bus, such that accessing operations to the I²C bus have to be performed via the management module. Thereby, the I²C bus can be prevented from being simultaneously accessed by multiple application programs, and thus, errors in data accessing can be avoided, which results the system in being more stable, easier for debugging and more time-saving for development. Moreover, program development for each I²C device can be simpler, and system integration and design can be more efficient.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for accessing data, applicable to an electronic apparatus, comprising:
receiving a plurality of transmission data and a plurality of identification codes respectively from a plurality of application programs and storing the plurality of transmission data to a queue according to a receiving order by a management module;
obtaining one of the plurality of transmission data according to a delivering order of the queue by the management module;

transferring the obtained transmission data to a corresponding device through an inter-integrated circuit ($I^2C$) driving module by the management module;

receiving one corresponding response data from the device through the $I^2C$ driving module by the management module; and transferring the response data to one of the corresponding application programs according to one of the plurality of identification codes corresponding to the obtained transmission data by the management module, wherein another transmission data continues to be obtained from the queue based on the delivering order to transfer the another transmission data to the device or another device only after the response data corresponding to the transmission data obtained last time is received by the management module, after another response data is received from the device or the another device, the another response data is transferred to one of the application programs corresponding to identification code of the another transmission data by the management module.

2. The method according to claim 1, wherein before the step of receiving the plurality of transmission data and the plurality of identification codes respectively from the plurality of application programs by the management module, the method further comprises:

receiving a register request from each of the application programs to generate one of the plurality of identification codes according to the register request by the management module; and transferring the one of the plurality of identification codes corresponding to the register request to each of the application programs by the management module.

3. The method according to claim 2, further comprising:

receiving a unregister request from each of the application programs by the management module; and canceling one of the plurality of identification codes corresponding to the unregister request by the management module.

4. The method according to claim 1, wherein a transmission format of each of the application programs comprises one of the plurality of identification codes, an $I^2C$ address, a data length and one of the plurality of transmission data.

5. The method according to claim 1, further comprising:

checking whether one of the plurality of transmission data exists in the queue by the management module and obtaining one transmission data from the plurality of transmission data according to the delivering order by the management module when checking that the one of the plurality of transmission data exists in the queue.

6. A system for accessing data, comprising:

a device;

an inter-integrated circuit ($I^2C$) bus, coupled to the device;

a processing unit, coupled to the $I^2C$ bus and accessing the device through the $I^2C$ bus; and a storage unit, coupled to the processing unit and storing a plurality of modules to be executed by the processing unit, wherein the plurality of modules comprises:

a management module, receiving a plurality of transmission data and a plurality of identification codes from a plurality of application programs, storing the plurality of transmission data to a queue according to a receiving order and transferring the plurality of transmission data according to a delivering order; and an $I^2C$ driving module, communicating with the plurality of application programs via the management module and accessing the device through the $I^2C$ bus, wherein the management module obtains one transmission data from the plurality of transmission data and transfers the obtained transmission data to the $I^2C$ driving module according to the delivering order, and wherein the $I^2C$ driving module transfers the obtained transmission data to the device through the $I^2C$ bus and transfers one response data received from the device through the $I^2C$ bus to the management module, such that the management module transfers the response data to one of the corresponding application programs according to one of plurality of identification codes corresponding to the obtained transmission data, wherein another transmission data continues to be obtained from the queue based on the delivering order to transfer the another transmission data to the device or another device only after the response data corresponding to the transmission data obtained last time is received by the management module, after another response data is received from the device or the another device, the another response data is transferred to one of the application programs corresponding to identification code of the another transmission data by the management module.

7. The system according to claim 6, wherein the management module receives a register request from each of the plurality of application programs to generate one of the plurality of identification codes according to the register request and transfers one of the plurality of identification codes corresponding to the register request to each of the plurality of application programs.

8. The system according to claim 7, when receiving a unregister request from each of the plurality of application programs, the management module cancels one of the plurality of identification codes corresponding to the unregister request.

9. The system according to claim 6, wherein a transmission format of each of the plurality of application programs comprises one of the plurality of identification codes, an $I^2C$ address, a data length and one of the plurality of transmission data, and the queue is a first in first out queue.

10. The system according to claim 6, wherein the management module checks whether one of the plurality of transmission data exists in the queue and obtains one transmission data from the plurality of transmission data according to the delivering order when checking that the one of the plurality of transmission data exists in the queue.

* * * * *